United States Patent

[11] 3,618,089

[72] Inventor  Robert B. Moran, Jr.
             Pasadena, Calif.
[21] Appl. No. 794,937
[22] Filed    Jan. 29, 1969
[45] Patented Nov. 2, 1971
[73] Assignee Moran Instrument Corporation
             Pasadena, Calif.

[54] RANGE AND TIME MEASURE SYSTEM
     17 Claims, 5 Drawing Figs.
[52] U.S. Cl............................................. 343/13 R,
             324/187, 343/5 DP, 343/7.3, 343/15, 343/17.7
[51] Int. Cl............................................. G01s 9/20
[50] Field of Search............................ 343/5 DP,
             7.3, 13, 17.7, 15, 13 R; 340/1; 324/68 C, 68 CV,
             186, 187

[56]              References Cited
                UNITED STATES PATENTS
3,013,208  12/1961  Voznak........................ 324/68 C
3,181,155   4/1965  Huckabay et al............. 343/5 DP X
3,302,199   1/1967  Kelly et al..................... 343/7.3
3,354,455  11/1967  Briggs et al................... 343/7.3
3,376,504   4/1968  Chick............................ 324/68 C

*Primary Examiner*—T. H. Tubbesing
*Attorney*—Christie, Parker & Hale

ABSTRACT: A precision range-measuring system combining digital and analog range-measuring techniques, operable on both a manual and automatic basis. The digital portion of the system is utilized to obtain the most significant digits of the range measurement and determines the amount of time delay after initiation of the range-measuring pulse before energization of the analog portion of the system. The analog portion is utilized to obtain the least significant digits of the range measurement. Readout of range information obtained by the system is provided by various means including direct display and a servo-plotting apparatus. Further refinements are incorporated to increase the accuracy of the analog portion of the system.

RANGE AND TIME MEASURE SYSTEM

BACKGROUND OF THE INVENTION

This invention relates to range and time measuring systems and in particular to precision range-measuring systems for use in automatic navigation and marine surveying applications.

In the past both digital and analog precision range-measuring systems have been used in applications such as fire control radar and precision radar navigation systems. A precision range-measuring system consists basically of apparatus capable of measuring an extremely short time interval with great accuracy. In a radar-measuring system this time interval is the time which elapses from the generation of a transmitted pulse to the return of the pulse when reflected from a target whose range from the radar system is to be measured.

Typically, digital range-measuring systems employ a crystal oscillator clock and a gate circuit which is opened by a trigger pulse corresponding to the start of a transmitted pulse The gate is then closed by a pulse from the receiver portion of the measuring system representing receipt of a signal such as the echo or reflection of the transmitted radar pulse which has completed the round trip to the target. In the case where a radar beacon or transponder is used at the target location, the return pulse is a pulse which has been generated and returned by the transponder. During the time that the gate circuit is open, precisely spaced pulses pass from the oscillator clock to a digital-counting circuit. When the gate is closed by the received pulse, the total number of pulses which has passed through the gate is either recorded or transferred to a storage apparatus. Digital range-measuring systems are characterized by high accuracy and the ease with which the information can be recorded or fed into other digital computing equipment for further processing. In conventional digital range-measuring systems the resolution is limited by the speed at which pulses can be accurately counted. Until recently, pulse counting techniques limited clock oscillators to a frequency of about 10 megahertz, thus limiting the resolution of a digital system to approximately ±50 feet. Another undesirable characteristic of digital range-measuring systems, where the output is to be used for operating a simple servo-plotter system, is that further data processing is required to average out statistical errors and to supply a suitable error or drive signal to the amplifier associated with the servo plotter.

Analog range-measuring systems have been highly developed for applications such as aircraft fire control radar. Typical systems of this type cover a relatively short range, on the order of 2 miles, but are able to achieve a range resolution of approximately 0.1 percent of its total range capability. This corresponds to a resolution of approximately ±10 feet for the ranges normally covered. The range information output from this type of system is typically in the form of a DC voltage which can easily be conditioned for driving a self-balancing potentiometer used in servo plotters A disadvantage of the analog type of system is that the resolution is proportional to the maximum range scale and therefore the resolution and accuracy deteriorates as the range scale is increased.

SUMMARY OF THE INVENTION

The present invention combines the advantages inherent in digital and analog range-measuring systems and utilizes the combination to offset or eliminate the disadvantages of each type of system if used individually.

In the present invention a range-measuring system is provided comprising means for transmitting a measuring signal to a reference point and means for receiving the measuring signal from the reference point. In addition, the system comprises a digital range-measuring section including digital time delay generator means for obtaining the most significant digits of the range measurement and an analog range-measuring section for obtaining the least significant digits of the range measurement. The digital range-measuring section further includes means for delaying the operation of the analog-measuring section until approximately the time of receipt of the measuring signal from the reference point.

In one embodiment of the invention the digital range-measuring section includes a digital counter which is either manually controlled or automatically switched by an output voltage from the analog section. In the manual version of this embodiment the number of pulses to be counted is preset by the system operator. The start of the analog section is delayed by fixed known increments of range corresponding to a predetermined number of pulses which the counter is required to count. These range increments are accurately determined by a precision crystal oscillator operating on a predetermined frequency which is the source of the pulses to be counted. The analog section interpolates in the time interval between the two successive clock pulses, this time interval being referred to herein as a "time window", during which the returned measuring signal is received by the system. Thus the resolution of the digital section is in effect multiplied by the resolution of the analog interpolating section of the system so that the resolution of a conventional digital system is extended by at least two orders of magnitude. In so doing the accuracy of the present system depends on the system bandwidth and the delay variation with received signal level rather than on the resolving power of the range-measuring technique used by the system.

In the latest commercially available marine radar equipment, receiver bandwidths of approximately 30 megahertz are used. Pulse widths of 0.05 microseconds are achieved in the short range mode of operation and the rise time of the transmitted RF pulse is on the order of 10 nanoseconds or less. It is, therefore, possible with this equipment to obtain range resolution accuracy on the order of 10 feet or better.

Several different techniques of analog tracking are contemplated for use with the present system for obtaining fine range measurement. Among these techniques are included conventional early gate/late gate ramp tracking and a second technique utilizing the delay introduced by a counter to start a linear range ramp generator. The ramp output from the generator continues until stopped by the reply measuring signal returned (pulse). Sample and hold circuits store the DC value of the stopped (truncated) range ramp output for averaging statistical errors until the desired sampling of the range ramp voltage has been obtained. The circuit then generates an analog range voltage output signal.

In one application the system of the present invention is well suited for use in an automatic navigation system. Such navigation systems are important for use in aircraft and ships and particularly in oceanographic and geophysical applications as well as marine and aerial surveys. When used in a navigation system, two reference points from which the distance to the measuring system is measured are needed to thereby derive the position of the vessel by conventional trilateration methods. The reference points are preferably marked by transponder stations which reply on two different radio frequencies to the shipboard station. The system is well suited for use with a servo plotter which will continually plot the vessel's position with respect to the two beacon stations. In addition to use in navigation applications, the plotting device of the present system can also be actuated by a precision depth recorder to automatically indicate depth points on a chart in ocean bottom contouring applications.

The range of the system of the present invention is determined by line-of-sight and is operable over distances as great as 100 miles where the elevation of the beacon stations will permit. Having been once set and locked onto the signals from the transponder stations, the system is automatic in its operation freeing the operator for other tasks and, in one embodiment, includes an automatic tracking plotter which continually plots the ship's map position with respect to the two transponder stations. Plotting is accomplished by two servo-operated lead screws which continually position a plotting head on the map. Mechanical counters geared into the two servo-plotting heads are also provided to read the range in suitable units of measure (feet, yards, meters, etc.) from the ship to each transponder station. A switch is optionally provided for simultaneously stopping the two plotting heads so that range information can be stored until it is ready for reading and recording from the two range counters. In addition, two digital shaft position encoders can be added to the two plotting heads so that the two range readings can be continually and automatically recorded on digital tape or some other digital printout device.

BRIEF DESCRIPTION OF THE DRAWING

These and other details of the present invention will be better understood by reference to the drawing wherein:

FIG. 5 is a block diagram of a double-ramp range measurement apparatus.

DESCRIPTION OF A SPECIFIC EMBODIMENT

Figure 1:
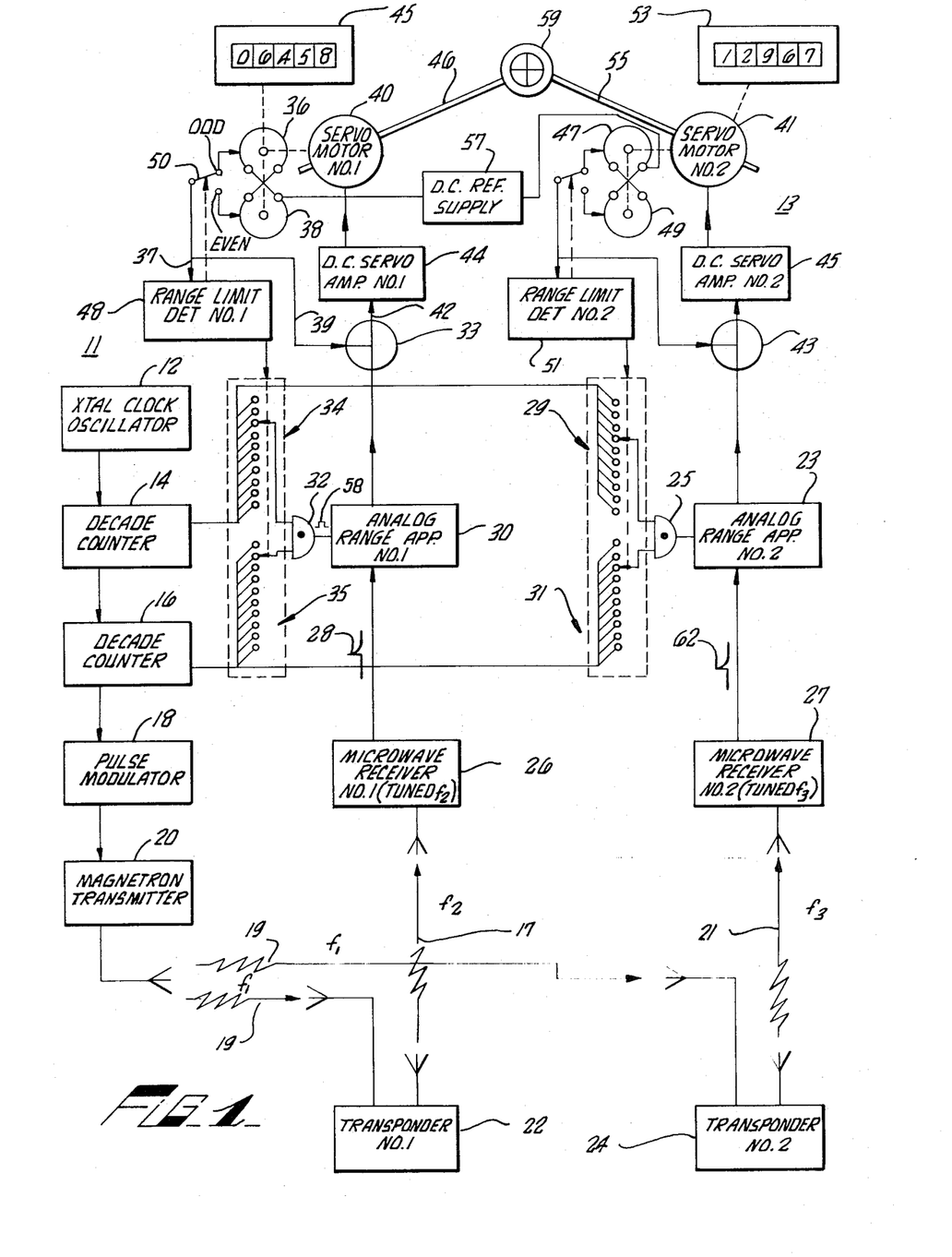
FIG. 1 is a block diagram of a navigation system embodying a range-measuring apparatus according to the present invention.

A navigation system suitable for shipboard mounting such as shown in FIG. 1 utilizes a crystal clock oscillator 12 which drives preset decade counters 14 and 16. In one embodiment the clock oscillator frequency is chosen to be 98.3 kc. so that time interval between clock oscillator pulses corresponds to a measuring signal round trip travel time of 5,000 feet. Counter 14 (units counter) counts each clock pulse and every 10th clock pulse produces an output pulse from counter 14 which is transmitted to and counted by decade counter 16 (tens counter). Counter 16 counts every 10th clock pulse and on every 100th clock pulse produces an output pulse which drives pulse modulator 18 and magnetron transmitter 20 for generation and transmission of a measuring signal 19 of a predetermined ratio frequency $f_1$ to two reference points. The measuring signal is, therefore, a series of pulses from transmitter 20, one transmitter pulse being generated for every 100 oscillator pulses. Transponders 22 and 24 located at the two reference points, respectively, are energized by receipt of the measuring signal from transmitter 20 and are in turn caused to generate signals which are transmitted back to the shipboard located navigation system. The return signals 17, 21 having second and third predetermined frequencies $f_2, f_3$ from transponders 22 and 24 are received respectively by microwave receivers 26 and 27 which are specially tuned to frequencies $f_2, f_3$.

As illustrated herein, the return signal is produced by a transponder operating on a predetermined frequency. The system of the present invention is equally adaptable to use with a more conventional radar system wherein the transmitted pulse is reflected by a target whose range from the radar system is to be measured and the range-measuring portion of the system is triggered into operation by receipt of the reflected pulse rather than a retransmitted pulse. The use of transponders is preferred since the accuracy and sensitivity of a range-measuring system according to the present invention are greatly enhanced if separate and discrete frequencies are used for the transmitted and retransmitted measuring signals to prevent triggering of the analog section of the range-measuring system by stray or erroneous signals.

Tracing the sequence of operation from receipt of a return signal at the microwave receiver, receiver 26 generates a received target pulse 28 which is transmitted to an analog range-tracking apparatus 30. Prior to generation and transmission of the range-measuring signal 19, stepper switches 34 and 35 have been preset by the system operator to a number corresponding to the number of pulses to be counted by counters 14 and 16 in the interval between transmission and receipt of each of the transmitted pulses which comprise the measuring signal. Initial setting of the counters can be accomplished by utilizing conventional radar range measurement indications as the basis for choosing the number of pulses which need to be counted. Once locked onto the returned measuring signal by manual adjustment of the counters, the operation of the system becomes automatic as the following description will shown.

As shown from the setting of switches 34 and 35 in FIG. 1, when 12 pulses are counted, AND-gate 32 generates a pulse and starts a range ramp generator (not shown) in apparatus 30 to generate a ramp voltage. The ramp generator is prearranged such that the time required for the ramp voltage to move from its minimum to maximum excursion is the same as the time interval between two pulses from clock oscillator 12, the "time window" referred to previously. The positions of the contacts on stepper switches 34 and 35 are electrically indicated by a digital readout, e.g., Nixie tubes, on the front panel of the navigation system apparatus which indicates the coarse range measurement (the significant digits of the distance) of the system to the location of transponder 22.

After the initiation of a ramp voltage in analog range apparatus 30 following the preselected time delay introduced by the counters 14, 16, the difference in the ramp voltage level at the instant the returned signal is received relative to its value at the initiation of the ramp is proportional to a residual range measurement over and above the coarse range measurement indicated by the position of the stepper switches. The analog section thus measures the time (and likewise the distance) which the measuring signal traveled during the time interval between two clock pulses (the "time window") and interpolates in that interval to provide a refined (a more highly resolved) range measurement to the reference point. In one embodiment of the system of FIG. 1, the sensed voltage difference is obtained by means of a conventional "early gate-late gate" tracking system in which the received pulse is balanced between two bracketing pulses. When so balanced, a DC voltage (the sensed voltage difference) is generated by the tracking system which is a DC voltage analog of the fine range measurement.

Thus the received target pulse 28 is compared with the range ramp in apparatus 30 and a DC range output voltage is generated having a voltage magnitude corresponding to the voltage of the range ramp at the instant the received pulse arrives at apparatus 30. The DC range output voltage from apparatus 30 is transmitted to a DC summing point 33 where it is compared to a voltage level derived from one of two range potentiometers 36 and 38 which are mechanically linked to the shaft of a servomotor 40. If the DC range voltage is greater or less than a reference signal supplied over circuit connection 39 from the range potentiometers, an error signal is transmitted over circuit connection 42 to a DC servoamplifier 44 where it is conditioned, amplified and transmitted to servomotor 40 causing the motor to advance or retract depending on the polarity of the error signal. Advancing or retracting the servomotor shaft in turn drives a lead screw 46 connected to a plotting head 59 causing the plotting head to move toward or away from servomotor 40 reflecting the new position of the vessel on which the tracking system is mounted relative to the transponder 22. A counter 45 such as a Veeder root counter is also mechanically connected to the shaft of servomotor 40 and is calibrated to read the distance to the transponder 22 according to the system of measuring units used.

As servomotor 40 is driven to eliminate error signal 42, the wipers of the pair of potentiometers 36 and 38, which are mechanically linked to the shaft of motor 40 and which are arranged 180° apart on their respective potentiometers, are driven along the potentiometers to increase or decrease the reference signal which is supplied to summing point 33. A DC power supply 57 provides a reference voltage to be divided by the two potentiometers 36 and 38. The output voltage (reference signal) from potentiometer 36 or 38 is likewise transmitted over connection 37 to a range limit detector 48 which controls the operation of a relay 50 and thereby selects one of potentiometers 36, 38 to supply the reference voltage to be transmitted to summing point 33.

Detector 48 also controls stepper switches 34 and 35. When the error signal from point 33 is positive and drives motor 40 and potentiometer 36 to a certain predetermined upper limit, detector 48 is activated and switches relay 50 to potentiometer 38 and at the same time operates stepper 34 to advance it one step (contact) thereby delaying the occurrence of the "-time window" and hence the start of the range ramp in tracker apparatus 30 an increment of time corresponding to an additional pulse from the clock oscillator. Thus, as indicated above, once the system is manually locked onto the return signal, it tracks the signal automatically, thereafter freeing the system operator for other duties. With the system in this new state, the received pulse 28 is encountered near the initiation of the range ramp (at a relatively low voltage along the ramp). As potentiometer 38 is phased 180° apart from potentiometer 36 and hence is at a relatively low value, the voltage level from apparatus 30 is compared at summing point 33 with a relatively low voltage thus preventing discontinuities or skips in the error signal 42 and elimination of any discontinuities in the signal transmitted to servomotor 40.

When the error signal is negative and tends to drive the wipers on the potentiometers in a negative direction, the limit detector 48 again switches relay 50 from one potentiometer to the other as it detects a lower limit voltage. Likewise stepper switch 34 is operated to start the range ramp one clock pulse interval earlier. In this instance, the voltage level from apparatus 30 has a relatively high value (occurring near the end of the range ramp cycle) and is compared with a relatively high voltage transmitted from the potentiometer presently in the circuit at the summing point 33.

Summarizing, in the embodiment shown in FIG. 1, the decade counters 14, 16, stepper switches 34, 35 and the AND-gate 32 correspond to a digital range-measuring section of the system and provide a coarse (most significant digits) range measurement of the distance to transponder 22. The analog range-tracking apparatus 30, (including the range ramp generator), together with summing point 33, servoamplifier 44, motor 40 and potentiometers 36, 38 comprise an analog range-measuring section of the system. In operation of the portion 11 of the navigation system just described, the digital section delays the start of operation of the analog section until the interval or "time window" occurs in which the received target pulse is located. Thus the analog range-measuring portion of the system is used to interpolate in the interval corresponding to the time between two clock pulses and to more precisely locate the instant of receipt of the received target pulse in that interval.

A second range-measuring system 13 shown in FIG. 1 provides the additional range information needed to make the apparatus of FIG. 1 a navigation system. In terms of structural elements and operating details, system 13 is similar to system 11 and provides a second set of stepper switches 29, 31, a second AND-gate 25, a receiver 27, analog range-tracking apparatus 23, summing point 43, servoamplifier 45, servomotor 41, counter 53, reference potentiometers 47, 49 and limit detector 51. A second lead screw 55 likewise interconnects servomotor with plotting head 59. The operation and interaction of systems 11 and 13 is described below in conjunction with the waveform diagrams illustrating operation of the navigation system of FIG. 1. Clock oscillator 12 and counters 14, 16 are utilized in system 13 in the same function performed for system 11.

Figure 2:
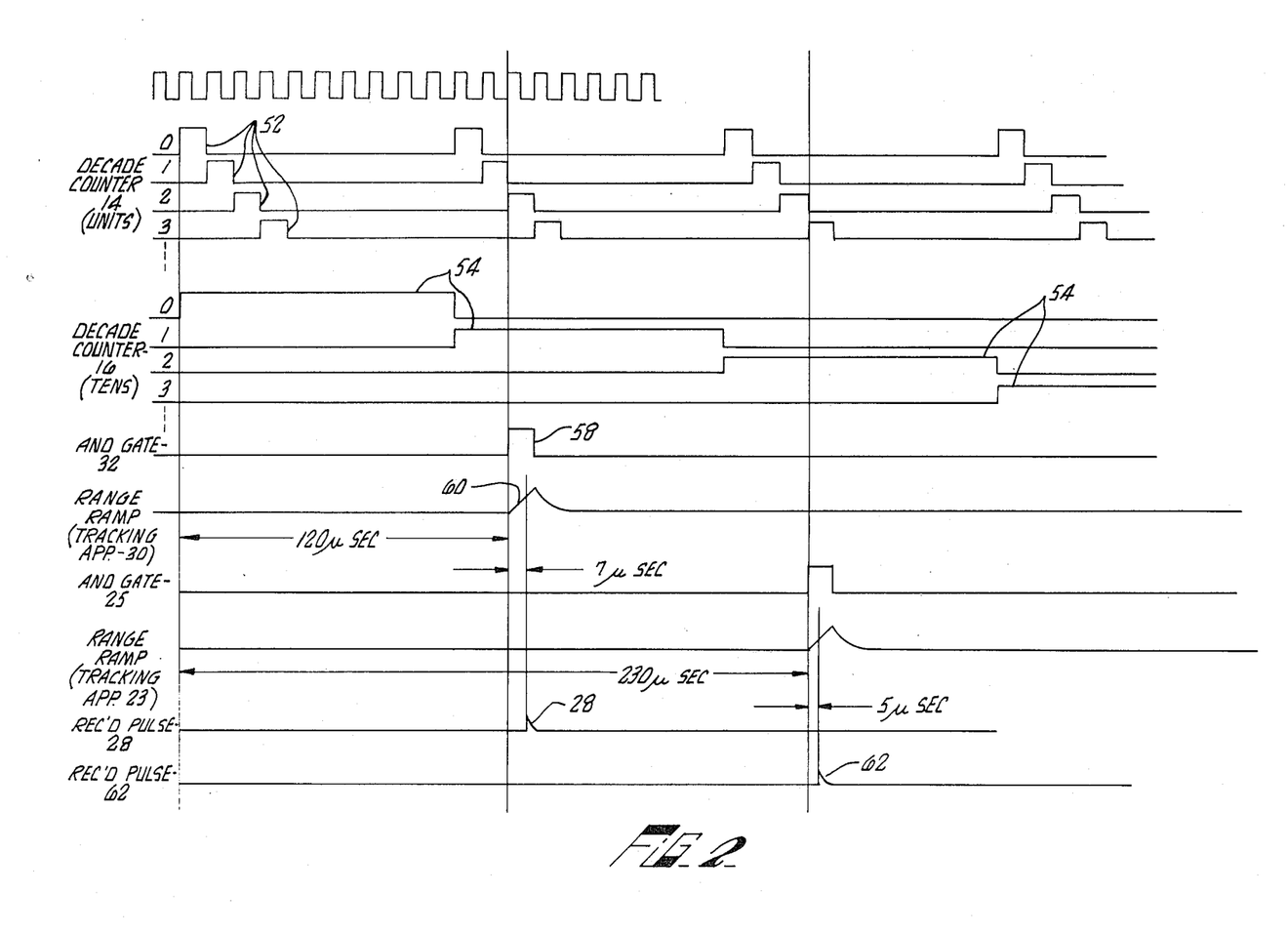
FIG. 2 is a waveform diagram illustrating operation of the system of FIG. 1.

FIG. 2 shows the waveforms just referred to. Each decade counter has 10 outputs which are wired to successive contacts on the two decade stepper switches 34, 35. Pulses 52 are the successively delayed output pulses from each of the first four outputs of the ten from decade counter 14. Pulses 54 are the first four of the 10 successively delayed output pulses from decade counter 16. AND-gate 32 produces an output pulse only when positive pulses are received through stepper switches 34, 35 from counter 14 and counter 16 respectively, to trigger the range ramp generator in the analog range-tracking apparatus 30. In this way the decade counters 14 and 16, decade switches 34, 35 and AND-gate 32 form a preset decade counter in which the switches 34, 35 are used to select a precision delay equal to the time interval between any integral number of oscillator pulses from 1 to 99. Since these delay increments are chosen to represent exact integral units of range, the positions of the contacts on switches 34, 35 represent the significant digits of the range being measured (e.g., 30,). For simplicity in describing the time-measuring system the clock oscillator is assumed to have a frequency of 100 kc., instead of 98.3 kc. The clock pulses are then exactly 10 microseconds apart and the delay increments are measured in integral units of time.

As can be seen from FIG. 2, and from the settings of switches 34 and 35, an output pulse 58 from AND-gate 32 is generated at the time of the "1" pulse from counter 16 and the "2" from counter 14 corresponding to a time 120 microseconds from generation of the measuring signal from transmitter 20. Received target pulse 28 is received at a time slightly in excess of 120 microseconds and at a voltage level along range ramp 60 corresponding to a time interval of 7 microseconds later. When the received target pulse 28 is matched (tracked) in apparatus 30 with range ramp 60, the apparatus generates a DC range voltage which is transmitted to a servo plotter and other display apparatus as discussed above to provide the highly resolved portion of the range measurement.

The received target pulse 62 from the second transponder 24 is, as shown in FIG. 2, received at a time 235 microseconds after transmission of the measuring signal by transmitter 20. Receipt of pulse 62 likewise causes the second range-measuring apparatus 13 to go into operation driving servomotor 41 and, in conjunction with motor 40, causing plotting head 59 to trace out the new location of the navigation system relative to the two transponders.

Figure 3:
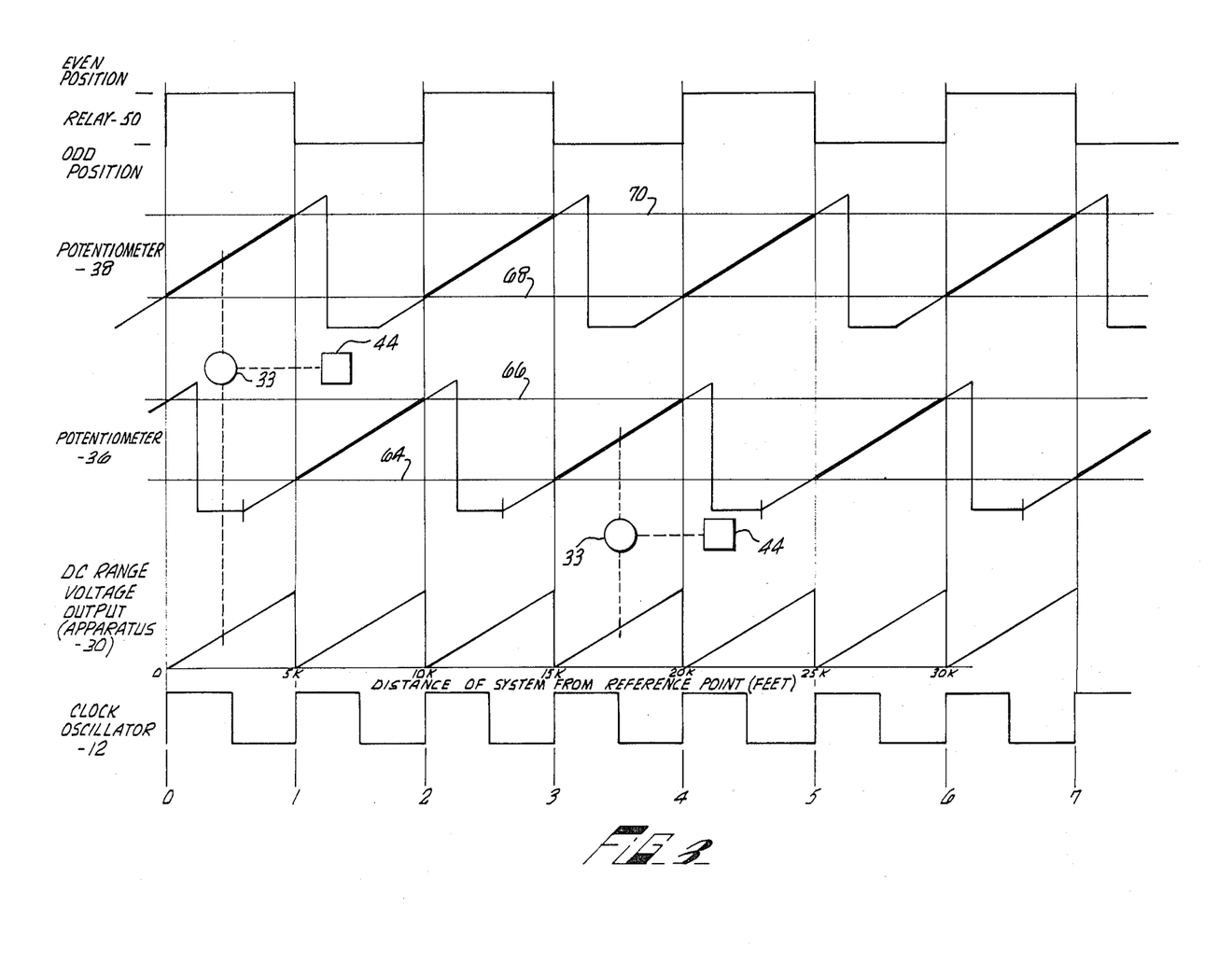
FIG. 3 is a waveform diagram illustrating the operation of the self-balancing potentiometer servo portion of the apparatus of FIG. 1.

The operation of the servo potentiometers 36 and 38 is illustrated in FIG. 3. During the interval that relay 50 is in the odd position, servo potentiometer 36 is connected to the range limit detector 48 and the DC summing point 33. Likewise, when relay 50 is in the even position, potentiometer 38 is connected to the limit detector and summing point. As the shaft of servomotor 40 drives the wiper of potentiometer 36 from a lower to a higher position, the output voltage from the potentiometer goes from a lower limit voltage 64 to an upper limit voltage 66. As indicated above, when voltages corresponding to limit voltages 64 and 66 are detected by limit detector 48, relay 50 is operated connecting the second of the two servo potentiometers into the circuit and disconnecting the first potentiometer. At the start of clock pulse 2, as shown in FIG. 3, the output of potentiometer 36 reaches limit voltage 66, causing relay 50 to switch to potentiometer 38 at its lower limit voltage 68. At the start of clock pulse 5, the output voltage of potentiometer 38 approaches its upper limit voltage 70 and relay 50 switches back to potentiometer 36. By using just 180° of the range of travel of each of the two potentiometers and providing a suitable DC reference voltage 57, two DC servo followup voltages which are 180° apart are produced by the potentiometers. The difference between the two follow-up voltages is constant and is adjusted to be equal to the voltage difference between the initiation and termination of the range ramp (which in turn corresponds to the time difference between two adjacent clock pulses). When the upper or lower limit voltages are encountered the feedback voltage connected to the summing point 33 switches from one potentiometer output to the other and automatically keeps the servoamplifier 44 near the balance point when switching is accomplished. Since only 180° in the center of each potentiometer range is used, the exact point of limit switching is not critical and the production of ambiguous data near the point of switching is avoided.

Figure 4:
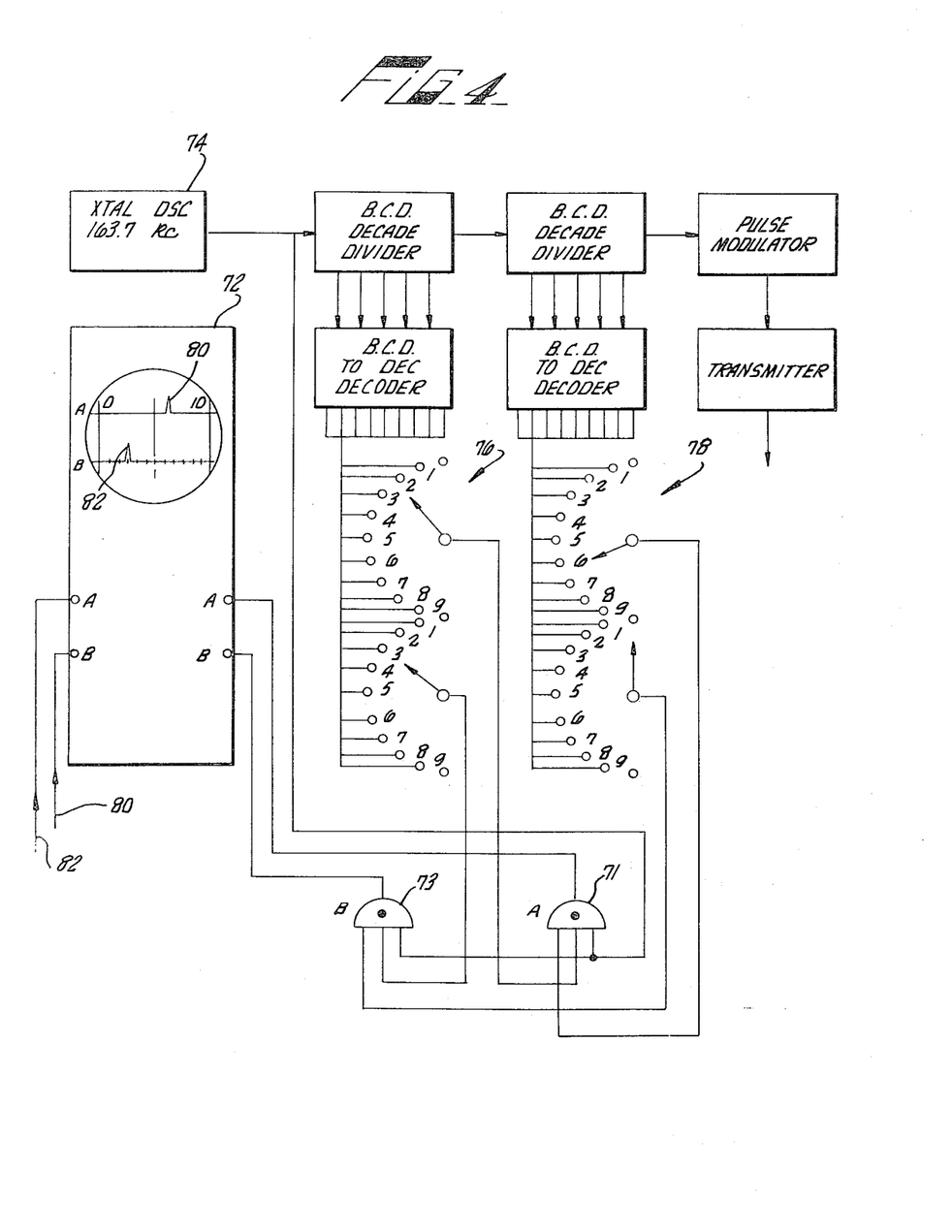
FIG. 4 is a block diagram of a manual embodiment of the system of FIG. 1.
Figure 6:
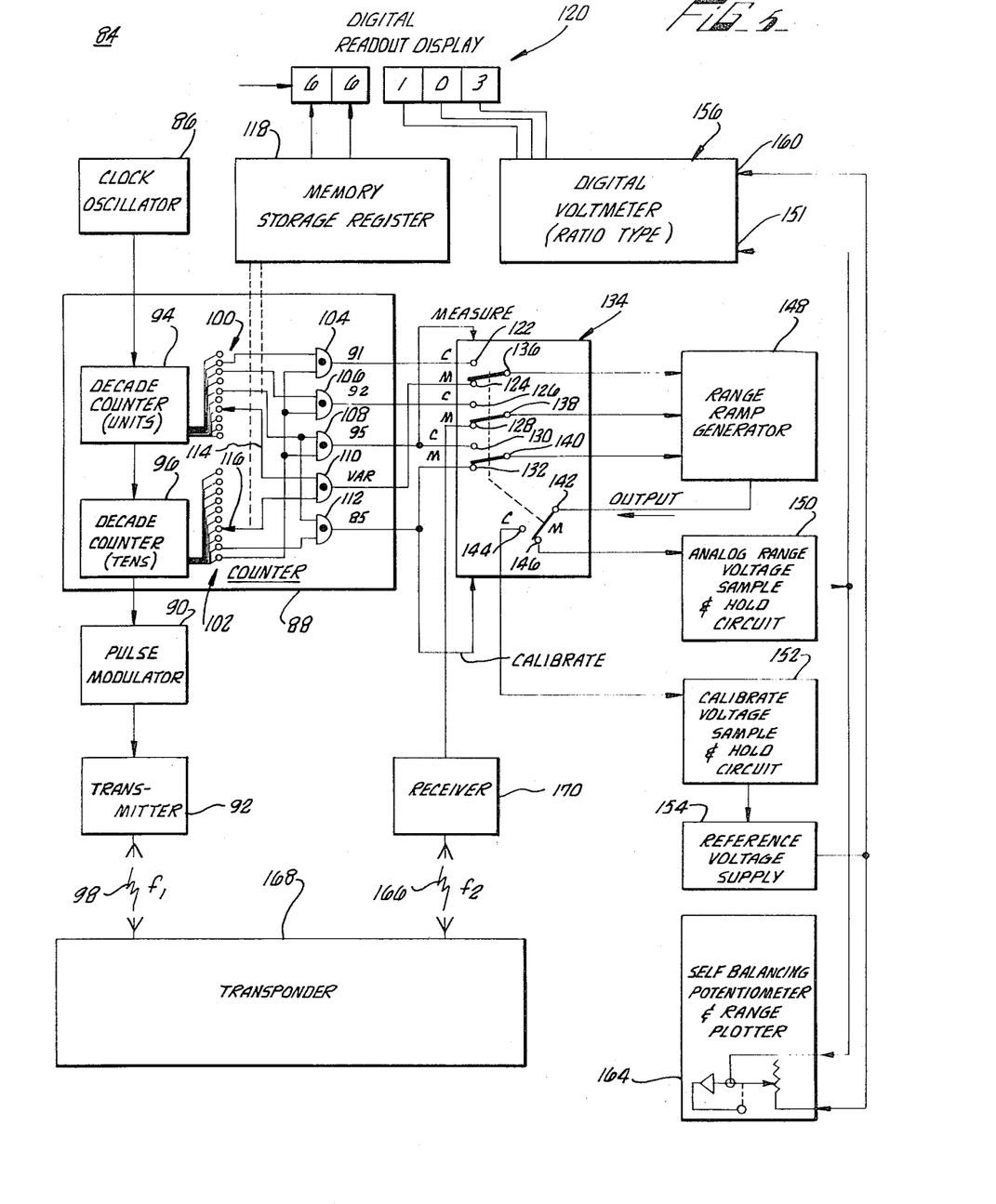

Another embodiment of a portion of a navigation system according to the present invention is illustrated in FIG. 4. This embodiment utilizes an oscilloscope 72 having two channels corresponding to the two measuring signals of a trilateration navigation system. In operation, the transmitted measuring pulse is synchronized with and initiated by a pulse chain from a crystal clock oscillator 74 through a pair of decade dividers. The output of oscillator 74 is also connected to a pair of AND-gates 71, 73. Each channel of the oscilloscope is first set on a sweep which will cover the entire time interval to be measured. The received signal is first observed on the oscilloscope with the digital counters 76 and 78 set at zero. The counters are then reset at a higher value (introducing a time delay before the start of scope sweep) until the received signal in each channel appears near the start of the sweep toward the left hand margin of the screen. The oscilloscope sweep speed is again increased to expand the scale and counters 76 and 78 adjusted until the sweep of the scope corresponds to the time interval between two adjacent clock pulses. At this point received pulses 80 and 82 are at an intermediate position between the limits of the scope trace in each channel and a final analog refinement of the distance to be measured can be read from the horizontal scale of the scope and added to the distance readings as read from counters 76 and 78, respectively. As shown in FIG. 4 the counters are calibrated in thousands of yards (clock frequency is 163.7 kc.) and the distance to reference points A and B are, respectively, 26,700 yards and 30,300 yards.

By choosing the proper frequency for the crystal clock oscillator which integrally relates the velocity of radio propagation ("$C$"=299,793 km./sec.) to the linear measuring units being used, the time between two adjacent clock pulses may be made exactly equal to a convenient even decimal number. For example, if the clock oscillator frequency is 1.49847 megahertz, the time interval between two consecutive clock pulses corresponds to a round trip signal travel distance of 100 meters. Similarly, frequencies of 163.7 kc. and 98.3 kc. correspond to signal round trip travel distances of 1,000 yards and 5,000 feet, respectively. In FIG. 4 the decimal delay reading on the dials corresponds to units of 1,000 yards. If the oscilloscope sweep calibration is then adjusted to exactly span the ten divisions on the graticule between two adjacent clock pulses, the final analog reading can be made directly in hundreds of yards from the oscilloscope graticule.

In contrast to the conventional early gate-late gate tracking system utilized in the system shown in FIG. 1, the range-measuring system of FIG. 5 utilizes a sample and hold tracking technique which derives an average DC voltage corresponding to the instant of time when a returned signal from a transponder is received. This is accomplished by a preset counter circuit 88 which is set by a storage register 118 to supply a precisely delayed trigger pulse which starts a linear range ramp sweep generator 148. The range ramp starts and continues to rise until stopped by the reply pulse from a beacon transponder station 168. The DC voltage value of the stopped (truncated) range ramp pulse is transferred and stored by a sample and hold circuit 150, averaged with subsequent samples of the DC value of subsequent truncated ramp pulses and used for fine range measurement. This average DC voltage is then tracked by a self-balancing potentiometer type of servosystem (as described above in connection with FIGS. 1—3) and can be used directly to control a range plotter. As before, the DC fine range voltage from the servo follow-up potentiometers is monitored by upper and lower limit amplifiers (not shown) which automatically switch between odd and even servo potentiometers 162 and at the same time switch the storage register 118 up or down to start the range ramp at an earlier or later time interval, as appropriate. If desired, the DC vernier (fine) range voltage can be read by a digital voltmeter 156 and this value, when added to the coarse range stored in the storage register, would give a complete range measurement in a digital form.

Operation of a time-measuring, range-measuring or navigational system according to the embodiment of FIG. 5 is further enhanced by providing a lock-on circuit (not shown) connected to counter 88, receiver 170 and the storage register 118 which determines whether the returned pulse is received during the appropriate time interval stored in the storage register. If a predetermined number of cycles passes (e.g., 10 series of 100 clock oscillator pulses) without receiving a reply pulse during the stored time increment, the storage register is automatically cleared and the coarse range counter circuit 88 allowed to count from zero until the reply pulse is received. This coarse measurement of the time required to receive a reply pulse is then stored in the delay storage register 118. On the next cycle, assuming the returned or reply pulse appears in the proper time interval, the range ramp generator is again brought into operation and begins to establish a DC analog fine range voltage. If the reply pulse appears in the proper time interval for several successive cycles (e.g., again ten series of 100 clock oscillator pulses) a new DC fine range voltage is established and the servosystem is energized. The lock-on circuit is also arranged to turn off the servomotor 158 at times when the target pulse is lost, thereby preventing the servo from operating on false information.

The elements of the measuring system 84 shown in FIG. 5 are as follows. For illustration purposes only, many of the elements of FIG. 5 are shown as mechanical or electromechanical devices such as relays. In a preferred embodiment of this apparatus the various counting, switching, resetting, etc., functions are accomplished by the use of digital circuitry, e.g., conventional integrated circuit logic modules. Correspondingly, linkages shown in FIG. 5 as mechanical interconnections can likewise be replaced by electrical connections. As with the measuring systems 11, 13 of FIG. 1, there is provided a clock oscillator 86, a counter 88, a pulse modulator 90 and a transmitter 92. Counter 88 comprises a units decade counter 94, and a tens decade counter 96 for counting the output pulses from clock oscillator 86. A range-measuring signal 98 having a frequency $f_1$ is thus generated by transmitter 92 for every 100 pulses from the clock oscillator. The digital equivalent of two decade switching modules 100, 102 are incorporated in counter 88 as are a series of AND-gates 104, 106, 108, 110 and 112. AND-gates 104, 106, 108 and 112 are associated with a calibration function of system 84. AND-gate 110 is associated with the measurement (range, time) function of system 84. The inputs 114, 116 to AND-gate 110 are controlled by a memory storage register 118 and produce outputs on coincidence as though the indicated switches (modules) 100, 102 respectively provided the desired amount of delay before the start of the analog portion of system 84. The settings of inputs 114, 116 are likewise displayed as the first two digits of a coarse range measurement by a digital readout display 120.

The outputs of AND-gates 104–112 are connected to a series of contacts (terminals) 122, 124, 126, 128, 130 and 132 in a switching apparatus 134. Contacts 124, 128 and 132 are associated with the range-measurement function of the apparatus. Contacts 122, 126 and 130 are associated with the calibration function of the apparatus. A start switching element 136 is alternately connectable between contacts 122 and 124. A stop switching element 138 is alternately connectable between contacts 126 and 128. A reset switching element 140 is alternately connectable between contacts 130 and 132. An output switching element 142 is alternately connectable between output contacts 144 and 146 which correspond to the calibration and measurement function respectively.

Elements 136, 138 and 140 are connected to the input side of a range ramp generator 148. The output from generator 148 is connected to element 142. Contact 146 is connected to an analog range voltage sample and hold circuit 150 and contact 144 is connected to a calibrate voltage sample and hold circuit 152. The output of circuit 152 is connected to a reference voltage supply 154. The output of circuit 150 is connected to a digital voltmeter 156 of the ratio type and a self-balancing potentiometer circuit 164. Circuit 164 operates on a servo principle similar to that portion of the circuit connected to the output of the analog range apparatus 30 of FIG.

1. A range plotter (not shown) may be connected to and operated by circuit 164. The reference voltage supply 154 is also connected to potentiometer 162 in circuit 164.

In operation a predetermined amount of time delay which is stored in the memory register 118 is introduced after the generation of pulse-measuring signal 98, having a frequency $f_1$, delaying the start of a range ramp by ramp generator 148 for a predetermined number of pulses corresponding to the time interval during which signal 98 is transmitted to transponder 168 and a second signal 166, having a frequency $f_2$, is generated by the transponder and returned to receiver 170 and to the analog-measuring portion of system 84. The range ramp is started, in the clock pulse interval bracketing the instant of time that signal 166 is received, by an output signal from AND-gate 110 as the last of the predetermined number of pulses is counted. The signal from gate 110 is transmitted through contact 124 and element 136 to start the range ramp generator, the ramp voltage having a period between zero and maximum values corresponding exactly to a clock pulse interval. The output from receiver 170 is transmitted to contact 128 and element 138 to stop the ramp generator. The voltage level to which the stopped ramp voltage has risen provides a voltage analog of the instant of time when the received signal has returned to the range-measuring apparatus. This analog range voltage from generator 148 is transmitted through element 142 and contact 146 to sample and hold circuit 150 where it is stored and held for averaging with subsequent samples of the analog range voltage. As counter 88 continues to count and reaches the 85th pulse after the start of the range-measuring sequence, a reset signal is transmitted from AND-gate 112 through contact 132 and element 140 to cause elements 136, 138, 140 and 142 to move to contacts 122, 126, 130 and 144, respectively, the calibration contacts of the switching apparatus 134. At the 91st pulse from oscillator 86 AND-gate 104 generates a start signal through contact 122 and element 136 to restart the ramp generator 148. At the instant of pulse 92, AND-gate 106 generates an output through contact 126 and element 138 to stop ramp generator 148 and to cause the voltage to be transmitted through element 142 and contact 144 to calibrate sample and hold circuit 152 where it is stored and held for providing a reference standard for the system to compensate for possible changes in the slope of range ramp. At count 95 AND-gate 108 generates an output pulse through contact 130 and element 140 causing ramp generator 148 to reset and to simultaneously cause elements 136, 138, 140 and 142 to return to electrical contact with contacts 124, 128, 132 and 146, the range-measuring contacts of the switching apparatus 134, preparatory to the start of another range-measuring sequence. The calibrate sample and hold circuit 152 regulates the output voltage of supply 154, the reference or supply voltage which energizes self-balancing potentiometers 162. If the slope of the ramp function in generator 148 changes, thereby producing a change in the analog voltage which is generated at the instant the ramp is stopped, the change in slope is detected by the calibration portion of the system. The calibration portion, in response to a slope change, produces a corresponding change in the reference voltage which is tapped by the mixer of potentiometer 162 to be supplied to servoamplifier and motor 158 which in turn controls the excursions of plotter 164, thus eliminating the introduction of error due to slope change. The changed reference voltage from supply 154 is likewise the voltage to which the output of circuit 150 is compared in the ratio-type digital voltmeter 156 preventing the introduction of error in this reading as well. In effect, the operation of the entire system is referred to the precision clock oscillator, utilizing the highly uniform intervals between adjacent clock pulses as the standard for operation of the measuring system.

Were the calibration portion of the system not included, a drift in the slope of the ramp could cause an error and inconsistency between the full scale voltage at the end of the ramp and the arbitrary standard voltage chosen to represent the time interval between two adjacent crystal markers (clock pulses). The error thus introduced would show up as a jump in the servo shaft position readout when the limit switches operate the delay setting of the counter to switch a longer or shorter delay time interval from the crystal count down chain in the system. Drift in the slope of the range ramp is thus compensated for by a suitable adjustment of the range reference voltage across the servo potentiometer.

This compensation is automatically made by using the range ramp generator to control the reference voltage for the potentiometer. This can be accomplished by the calibration function, i.e., periodically starting and stopping the ramp generator by means of two adjacent time marker pulses and preserving this voltage in a sample and hold circuit identical to that used in the range measurement. The reference voltage thus generated is used as the standard in a conventional degenerative voltage regulator circuit to regulate the voltage across the servo potentiometer. Once a relation between the potentiometer voltage and the time generated reference has been properly set, the system automatically preserves the proper scale relation between the vernier (fine measurement) ramp and the time standard. Any change in slope of the ramp generator causes a corresponding change in the analog vernier voltage, but at the same time causes a proportional change in the voltage across the potentiometer which is being used as a time reference. Therefore, no net change occurs in the balance point which represents the time or range being read out from the potentiometer. In effect, the entire self-balancing servo loop becomes a ratio bridge which is used to accurately divide the time interval between precision time marker pulses (clock pulses) and measure the last digits of the total time interval being measured. The most significant digits in this measurement are obtained from the counting chain (digital portion of the system) which counts the crystal marker pulses. By this means, the entire time measurement process is referenced directly to the crystal oscillator.

In addition to a mechanical servo readout, the analog measurement voltage from the circuit described above can be integrated or filtered to improve its statistical accuracy and the last decimal places of the range can be read out by a standard digital voltmeter. In this case the reference voltage for the digital voltmeter is derived from the regulated potentiometer reference supply described above. The digital voltmeter performs a ratio measurement which is referenced directly to the crystal oscillator, thus avoiding any error or inconsistency between the most significant digits of the measurement derived from the oscillator counting circuitry and the least significant digits of the measurements derived from the digital voltmeter.

The system described above is, in effect, a double ramp measurement system, deriving an analog or vernier measurement during the generation of a first ramp and a reference voltage to which the analog measurement is compared from the generation of a second ramp during each cycle of system operation.

The above-described range circuitry is also simpler and more compact than tracking circuitry which employs the conventional fire control, early gate/late gate discriminator principle referred to above in conjunction with FIG. 1. In fire control range-tracking circuits where many target pulses may be present, it is necessary for the tracking circuitry to track a particular pulse in the presence of other unwanted target pulses. However, in a transponder type of range-measuring system where the transponder station replies on a different frequency, only one target pulse per repetition rate cycle is present in the receiver with the same repetition frequency as the master station. Therefore, the much simpler tracking technique described immediately above can be utilized reliably. In those instances where the master station receiver is swept by an occasional radar, it will not affect the operation of the system unless the received pulse happened to fall in the coarse range time block where the fine range measurement was being made. Even where a stray pulse does fall in the time block where measurement is being made, this single piece of false information is quickly averaged out in the sample and hold circuit and the servo system.

What is claimed is:

1. A system for measuring the time interval between recurrent transmitted pulses and delayed recurrent received pulses comprising in combination,
   a. digital time delay generator means for producing recurrent output trigger pulses, said digital time delay generator means including means for setting the time delay interval of said recurrent output trigger pulses with respect to the recurrent transmitted pulses in discrete incremental steps;
   b. analog time delay measuring means, coupled to said digital time delay generator means, said analog time delay measuring means being responsive to said recurrent output trigger pulses and being adapted for receiving the delayed recurrent received pulses for measuring the time delay interval between said recurrent output trigger pulses and the recurrent received pulses; and
   c. means coupled between said analog time delay measuring means and said digital time delay generator means for increasing the time delay interval of said recurrent output trigger pulses by one discrete incremental step when the time delay interval between said recurrent output trigger pulses and the recurrent received pulses reaches a predetermined upper limit and for decreasing the time delay interval of said recurrent output trigger pulses by one discrete incremental step when the time delay interval between said recurrent output trigger pulses and the recurrent received pulses reaches a predetermined lower limit.

2. The system as defined by claim 1 wherein the difference in time between said predetermined upper limit and said predetermined lower limit is substantially equal to one discrete imcremental step of time delay interval of said recurrent output trigger pulses from said digital time delay generator means.

3. The system as defined by claim 1 wherein said digital time delay generator means includes an oscillator producing clock pulses, a first decade counter coupled to said oscillator, and a first switch means coupled to said first decade counter for setting the number of pulses to be counted by said first decade counter.

4. The system as defined by claim 3 wherein said digital time delay generator means further includes a second decade counter coupled to said first decade counter, second switch means coupled to said second decade counter for setting the number of pulses to be counted by said second decade counter, and means coupled to said first and second decade counters for producing said recurrent output trigger pulses.

5. The system as defined by claim 3 wherein each discrete incremental step of time delay interval of said recurrent output trigger pulses is equal to the time interval between successive clock pulses from said oscillator.

6. The system as defined by claim 3 wherein the difference in time between said predetermined upper limit and said predetermined lower limit is substantially equal to the time interval between successive clock pulses from said oscillator.

7. The system as defined by claim 1 further comprising first indicating means coupled to said digital time delay generator means for indicating the time delay interval of said recurrent output trigger pulses in discrete incremental steps.

8. The system as defined by claim 1 further comprising second indicating means coupled to said analog time delay measuring means for indicating the time delay interval between said recurrent output trigger pulses and the recurrent received pulses.

9. The system as defined by claim 1 wherein said analog time delay measuring means includes a ramp generator means having one input coupled to said digital time delay generator means and a second input adapted to receive the delayed recurrent received pulses, said ramp generator means producing an output voltage having a value proportional to the time delay interval between said recurrent output trigger pulses from said digital time delay generator means and the recurrent received pulses.

10. The system as defined by claim 9 further comprising indicating means coupled to said ramp generator means for indicating the value of said output proportional to the time delay interval between said recurrent output trigger from said digital time delay generator and the recurrent received pulses.

11. The system as defined by claim 9 further including
    a source of reference voltage, and
    a servomechanism follow-up loop coupled to said ramp generator means and including a pair of potentiometers connected to the reference voltage source, the pair of potentiometers each having a winding and a movable tap in contact with the winding, the taps being mechanically linked to the servomechanism and spaced a fixed distance apart on their respective winding for producing two servo follow-up voltages, the taps being alternately connectable to the input to the servomechanism and the voltage difference between the movable taps being adjusted to be equal to the voltage difference between a lower and an upper limit value on the ramp voltage in the analog time delay measuring means for measuring said output voltage.

12. A measuring system according to claim 11 further including
    switching means connected between the follow-up loop and the digital time delay generator means for changing the time delay interval of said recurrent output trigger pulses at the upper and the lower limit values of the ramp voltage and for simultaneously switching the follow-up loop of the servomechanism from one of said potentiometer taps to the other.

13. A measuring system according to claim 12 including
    digital display means operatively linked to the pair of potentiometers for providing a digital readout of the least significant digits of the range measurement.

14. The system as defined by claim 9 further including,
    a first sample and hold circuit
    a second sample and hold circuit, and
    switching means for alternately connecting the first and second sample and hold circuits to said ramp generator means, the first sample and hold circuit being arranged to sample and hold said output voltage and the second sample and hold circuit being arranged to periodically sample and hold the value of output voltage from said ramp generator means when the value of the output voltage is equivalent to one discrete incremental step of time delay of said recurrent output trigger pulse from said digital time delay generator means.

15. The system as defined by claim 1 wherein said means coupled between said analog time delay measuring means and said digital time delay generator means for increasing or decreasing the time delay interval of said recurrent output trigger pulses includes a range limit detector responsive to an upper limit and to a lower limit of time delay measurement of said analog time delay measuring means.

16. The system as defined by claim 15 wherein the difference in time between said upper limit and said lower limit of time delay measurement is substantially equal to one discrete incremental step of time delay interval of said recurrent output trigger pulses from said digital time delay generator.

17. A system for measuring the time interval between recurrent transmitted pulses and delayed recurrent received pulses comprising in combination,
    a. digital time delay generator means for producing recurrent output trigger pulses, said digital time delay generator means including means for setting the delay interval of said output trigger pulses with respect to the recurrent transmitted pulses in discrete incremental steps,
    b. first indicating means coupled to said digital time delay generator means for indicating the time delay interval of said output trigger pulses in discrete incremental steps, c. ramp generator means having one input coupled to said digital time delay generator and a second input adapted to receive the delayed recurrent received pulses, said ramp generator means producing an output voltage having a value proportional to the time delay interval between said recurrent output trigger pulses from said digital time delay generator and the recurrent received pulses, d. second indicating means coupled to said ramp generator means and being responsive to said output voltage for indicating the time delay interval between said recurrent output trigger pulses and the recurrent received pulses, and e. means coupled between said second indicating means and said digital time delay generator means for increasing the time delay interval of said output trigger pulses by one discrete incremental step when the time delay interval between said recurrent output trigger pulses and the recurrent received pulses reaches a predetermined upper limit and for decreasing the time delay interval of said output trigger pulses by one discrete incremental step when the time interval between said recurrent output trigger pulses and the recurrent received pulses reaches a predetermined lower limit.

* * * * *

RJW
PO-1050
(5/69)

UNITED STATES PATENT OFFICE
CERTIFICATE OF CORRECTION

Patent No. __3,618,089__   Dated __November 2, 1971__

Inventor(s) __Robert B. Moran, Jr.__

It is certified that error appears in the above-identified patent and that said Letters Patent are hereby corrected as shown below:

On Title Page at (54) "MEASURE" should read "MEASURING"

Col. 1 line 70 - insert the words "including analog time delay measuring means" after the word "section" and before the word "for"

Col. 5 line 8 - "-time window" should read "time window"

Col. 6 line 11 - "(e.g.,30,)" should read "(e.g., 30,--- ft.)'

Col. 9 line 59 - "mixer" should read "wiper"

Col. 12 line 6 - insert the word "voltage" after the word "output" and before the word "proportional"

Signed and sealed this 27th day of June 1972.

(SEAL)
Attest:

EDWARD M. FLETCHER, JR.    ROBERT GOTTSCHALK
Attesting Officer          Commissioner of Patents